United States Patent [19]

Anderson

[11] Patent Number: 4,955,075
[45] Date of Patent: Sep. 4, 1990

[54] BATTERY SAVER CIRCUIT FOR A FREQUENCY SYNTHESIZER

[75] Inventor: George C. Anderson, Sunrise, Fla.

[73] Assignee: Motorola, Inc., Schaumburg, Ill.

[21] Appl. No.: 258,935

[22] Filed: Oct. 17, 1988

[51] Int. Cl.$^5$ ............................ H03L 7/00; H03L 7/06
[52] U.S. Cl. ..................................... 455/182; 455/183; 455/343
[58] Field of Search ............... 455/343, 117, 127, 164, 455/182, 192, 165, 183, 226, 262; 331/14

[56] References Cited

U.S. PATENT DOCUMENTS

| | | | |
|---|---|---|---|
| 4,349,789 | 9/1982 | Kurihara | 331/14 |
| 4,365,349 | 12/1982 | Ogita et al. | 455/192 |
| 4,521,918 | 6/1985 | Challen | 455/343 |
| 4,596,046 | 6/1986 | Richardson et al. | |
| 4,651,104 | 3/1987 | Miyo | 455/192 |
| 4,703,520 | 10/1987 | Rozanski, Jr. et al. | |
| 4,721,924 | 1/1988 | Masdea et al. | 455/1 |
| 4,817,197 | 3/1989 | Shimizu et al. | 455/208 |

OTHER PUBLICATIONS

Microelectronics, Jacob Millman, PH.D., Arvin Grabel, Second Edition, pp. 110–114, and 156–160.

Primary Examiner—Reinhard J. Eisenzopf
Assistant Examiner—Lisa Charovel
Attorney, Agent, or Firm—Michael J. Buchenhorner

[57] ABSTRACT

A radio receiver (102) receives on a selected one of a plurality of channels, one of which is a control channel. A continuous signal is transmitted on the control channel. A frequency synthesizer (122) includes a voltage controlled oscillator (VCO 124) and a plurality of phase lock circuits (126), such as a phase detector (130), a reference oscillator (134), a programmable divider (128) and a loop filter (132). The input of the VCO can be switched between the phase lock circuits and an automatic frequency control circuit (AFC 114), which is connected to the radio receiver. When the radio receiver is receiving a quality control channel signal, the switch is positioned to select the AFC circuit and, consequently, the VCO is frequency locked to the control channel signal. Whenever the VCO is locked to the control channel signal, one or more of the phase lock circuits are deactivated, thereby reducing power consumption. When the radio receiver is tuned to a channel other than the control channel, the VCO is phase locked to the reference oscillator by activating the phase lock circuits and positioning the switch such that the VCO input is coupled to the phase lock circuits.

9 Claims, 2 Drawing Sheets

BATTERY SAVER CIRCUIT FOR A FREQUENCY SYNTHESIZER

BACKGROUND OF THE INVENTION

This invention pertains to frequency synthesizers and phase locked loops and, more particularly, to a battery saver circuit for a frequency synthesizer that incorporates a selectable automatic frequency control circuit.

The introduction of frequency synthesizers into portable, battery operated radios has, to a considerable extent, increased the number of channels that these radios can receive or transmit on. The disadvantage of a synthesizer, however, is that it consumes considerable more current than a conventional crystal controlled oscillator circuit.

One of the primary design objectives of a portable, battery operated radio is to achieve the maximum time between battery charges or replacements, i.e., to achieve the minimum current drain on the battery. Accordingly, the invention described below is a frequency synthesizer circuit that substantially reduces the current drain of its battery power source, thereby prolonging battery life.

The primary application for this invention is in trunked radio communication systems. Trunked radio systems include a plurality of "voice" channels and at least one control channel. The control channel is a duplex channel, i.e., it includes an outbound (base station to remote unit) frequency, and an inbound (remote to base) frequency. A radio base station transmits a continuous signal on the outbound control channel frequency. When a remote unit (e.g., a portable or mobile radio transceiver) operator initiates a call to another remote unit, a request is transmitted on the inbound control channel frequency for a voice channel assignment. If a voice channel is available, the base station transmits an assignment of a particular channel to the requesting remote unit by appropriately modulating the request on the continuously transmitted outbound control channel signal. Upon receiving this assignment, the requesting remote unit switches to the assigned voice channel. When the call is completed, the remote unit switches back to and continuously monitors the outbound control channel frequency until directed to go to another channel by the base station.

The invention described below takes advantage of the continuous transmission of the control channel signal by the base station. This invention employs an automatic frequency control circuit that frequency locks the synthesizer to the control channel signal whenever the remote radio unit is receiving on the control channel. When frequency locked in this manner, the invention turns off one or more of the circuits in the frequency synthesizer, thereby reducing battery drain.

SUMMARY OF THE INVENTION

Briefly, the invention is a battery saver circuit that includes a frequency synthesizer having a reduced power operating mode. Included are a selectable frequency lock means for frequency locking a synthesizer output signal to a control signal, and a selectable phase lock means for phase locking the synthesizer output signal to a reference signal. A control means is included for selecting either the frequency lock means or the phase lock means. The control means also places the frequency synthesizer in the reduced power operating mode when the frequency lock means is selected.

In another embodiment, the invention is a battery saver circuit for use in a communications system that includes a plurality of channels. One of these channels is a control channel having a control channel signal. The battery saver circuit includes a frequency synthesizer with a controlled oscillator and selectable phase lock means for phase locking the controlled oscillator to a reference signal. A selectable automatic frequency control (AFC) means is included for frequency locking the controlled oscillator to the control channel signal. Also included is a receiving means for receiving signals on selected channels. The receiving means is coupled to the AFC means. In addition, a control means is included for selecting the AFC means when the receiving means is receiving the control channel signal. The control means also disables a portion of the phase lock means when the AFC means is selected. This reduces the power consumption of the frequency synthesizer.

DESCRIPTION OF THE PREFERRED EMBODIMENT

Figure 1:
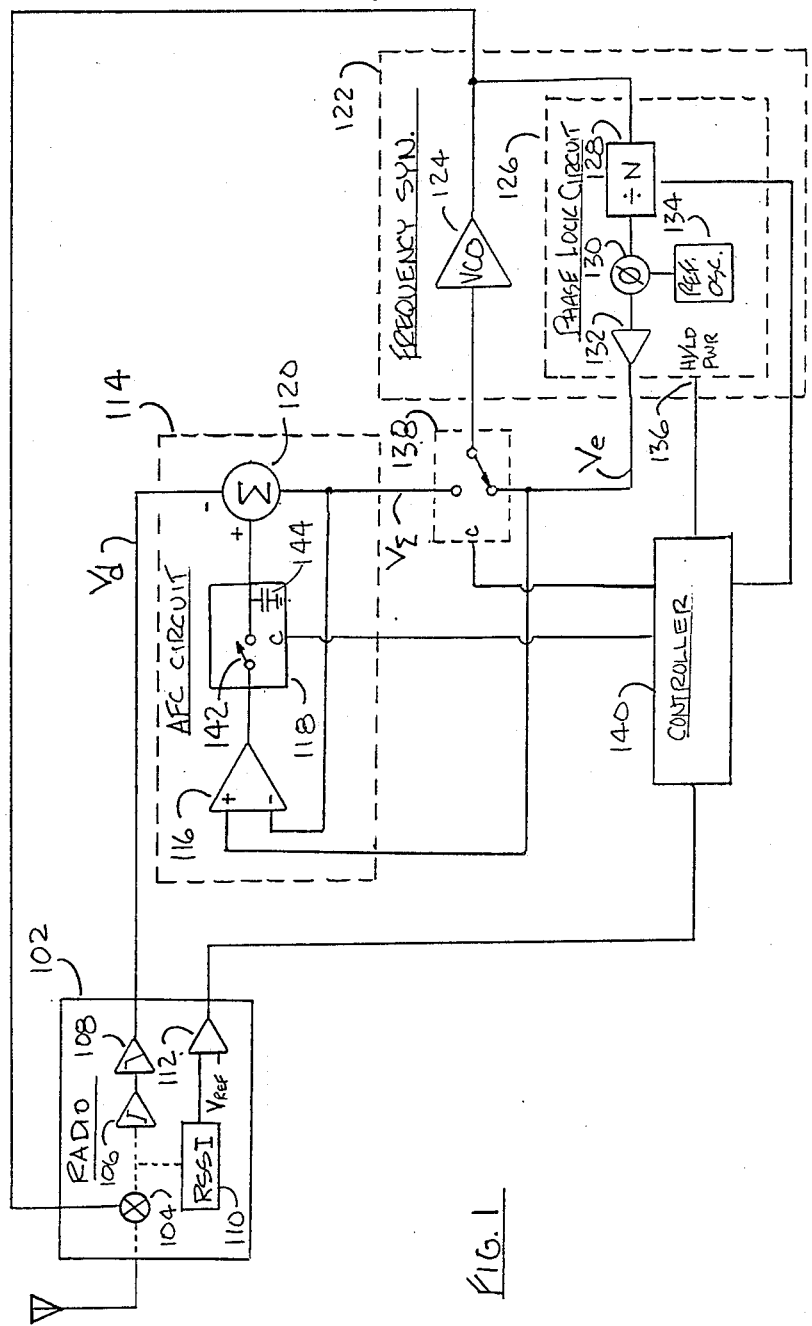
FIG. 1 is a block diagram of the present invention.

Referring to FIG. 1, a radio receiver 102 includes well known circuitry, such as mixer 104, discriminator 106 and low pass filter 108. Radio 102 also includes other well known, but non-illustrated radio receiver circuits. The preferred embodiment of the invention is designed to operate in a radio communication system, such as a trunked radio system, in which a non-illustrated base station continuously transmits a signal on a control channel.

Radio 102 also includes a well known relative signal strength indicator (RSSI) 110. A voltage comparator circuit 112 is connected to the output of RSSI circuit 110 and a reference voltage $V_{ref}$ is applied to one input of the comparator. RSSI 110 provides an indication of the quality of a received signal by measuring the strength of the signal. Although it is preferred to correlate signal quality with signal strength, the invention may also be practiced with circuits that provide an indication of signal quality based on factors other than signal strength, such as bit error rate.

An automatic frequency control (AFC) circuit 114 includes a voltage comparator 116, sample and hold circuit 118 and summing circuit 120. Frequency synthesizer 122 includes a voltage controlled oscillator 124 and a plurality of phase lock circuits 126. Phase lock circuitry 126 includes a programmable divider 128, a phase detector 130, a loop filter 132 and a reference oscillator 134. The invention is not limited by the particular frequency synthesizer circuit illustrated in FIG. 1, but may be practiced with any frequency synthesizer that incorporates a frequency controlled oscillator, such as VCO 124.

Phase lock circuitry 126 includes an input 136 for controlling the power consumption of synthesizer 122. In the high power mode, all phase lock circuits (128, 130, 132 and 134) are activated. In the low power mode, one or more selected phase lock circuits are deactivated. Deactivation of a particular phase lock circuit is accomplished by disconnecting the power supply (i.e., a non-illustrated battery) from each circuit to be deactivated. To disconnect the power supply, a non-illustrated transistor switch is inserted between the power supply and the power supply input terminal of the phase lock circuit, and the appropriate voltage or current is applied to the gate or base of the transistor by controller 140.

A single pole, double throw (SPDT) electronic switch 138 has two positions. In the first position, the output of phase lock circuitry 126 is coupled to the VCO input of frequency synthesizer 122, while, in the second position, the output of AFC circuit 114 is coupled to the VCO input. Switch 138 is under the control of controller 140. Controller 140 is preferably a well known microcomputer or microcontroller, although other well known discrete control circuitry may also be suitable.

OPERATION

Radio 102 receives a signal on a selected one of a plurality of channels, one of which is a control channel. Receiver channel selection is achieved by changing the frequency of the injection signal to mixer 104. This injection signal comes from frequency synthesizer 122. When switch 138 is in the first position (the position illustrated in FIG. 1), the frequency of the injection signal is selected in a conventional manner, such as by changing the divisor N of divider 128. The received radio signal is demodulated by discriminator 106 and low pass filtered by filter 108. This produces a detected signal $V_d$ having a voltage which is proportional to the frequency of the received carrier.

The invention has two modes of operation: the "phase lock" mode and the "frequency lock" mode. In the phase lock mode, switch 138 is in the first or illustrated position, such that the output of phase circuitry 126 (signal $V_e$) is directly connected to the input of VCO 124. In the phase lock mode, switch 142 is usually closed. Since all phase lock circuitry 126 is activated, the phase lock mode is also the high power mode of operation. The phase lock mode is selected by controller 140 when radio 102 is receiving on a non-control channel, or, if receiving on the control channel, when the quality of the control channel signal is below a predetermined threshold level, as set by $V_{ref}$.

In the frequency lock mode, switch 138 is in the second position such that the output of AFC circuit 114 (signal $V_\Sigma$) is directly connected to the input of VCO 124. In the frequency lock mode, switch 142 of AFC circuit 114 is open, and the low power mode is selected by deactivating one or more of the phase lock circuits (128, 130, 132, and 134). The frequency lock mode is selected by controller 140 when radio 102 is receiving a good quality control channel signal.

In the phase lock mode (i.e., when switch 138 is in the first position), frequency synthesizer 122 functions in a conventional phase locking manner. More specifically, the output signal of VCO 124 is divided by programmable divider 128, the divisor N being set by controller 140. Phase detector 130 compares the phase of the output signal of divider 128 to the phase of the output signal of reference oscillator 134. The output signal of phase detector 130 is filtered by loop filter 132. The output of loop filter 132 is error signal $V_e$, which is coupled to the input of VCO 124 when switch 138 is in the first position. Since the output signal of VCO 124 is coupled to mixer 104 of radio 102, the frequency of the VCO output signal determines the receive frequency of the radio.

The error voltage $V_e$ is also coupled to a first input of comparator 116. In the phase lock mode, switch 138 is in the first position and the output of comparator 116 is continuosly (or periodically) sampled by sample and hold circuit 118. A typical sample and hold circuit comprises a SPST switch 142 with a capacitor 144 connected to the output of the switch, as illustrated in FIG. 1. Thus, when the sample and hold circuit is continuosly sampling, sample and hold switch 142 is continuously closed and the output of comparator 116 is directly coupled to the input of summing circuit 120. When sample and hold switch 142 is closed, AFC circuit 114 is operating "closed loop". If we assume that comparator 116 has infinite gain and zero offset voltage, output voltage $V_\Sigma$ of AFC circuit 114 must be equal to error voltage $V_e$ of phase lock circuitry 126. If this were not true, the output voltage of comparator 116 would, theoretically, be infinite (more realistically, the output voltage would be at the supply voltage rail). The voltage across sample and hold capacitor 144 will be $V_e$ plus the filtered, discriminator output voltage $V_d$.

When controller 140 switches radio 102 to the control channel (by changing the output frequency of frequency synthesizer 122 and, consequently, the injection frequency of mixer 104), error voltage $V_e$ changes. After a brief period of time to allow error voltage $V_e$ and AFC output voltage $V_\Sigma$ to stabilize, controller 140 commands sample and hold circuit 118 to hold the voltage currently at the output of comparator 116. For the sample and hold circuit illustrated in FIG. 1, this is accomplished by opening sample and hold switch 142. The voltage $V_e$ present at the input to sample and hold circuit 118 just prior to opening switch 142 will be held by capacitor 144. (The sample and hold circuit of FIG. 1 assumes that the input impedance of summing circuit 120 is extremely large, such that a negligible amount of charge is drained from capacitor 144 during the holding period.)

The controller then commands switch 138 to the second position, such that the input of VCO 124 is connected to the output of AFC circuit 114. The circuit is now in the frequency lock mode. Immediately after switching to the AFC circuit, the voltage $V_\Sigma$ is substantially identical to error voltage $V_e$ and, consequently, the output frequency of synthesizer 122 remains unchanged. The controller then commands the frequency synthesizer into the low power mode. In the low power mode, one or more of the phase lock circuits, such as divider 128, phase detector 130 or reference oscillator 134, are shut down, thereby conserving power supply current (i.e., battery charge).

Any minor changes in the frequency of the output signal of VCO 124, or in the carrier frequency of the received control signal will cause a corresponding change in the discriminator output voltage $V_d$. When sample and hold switch 142 is open, the output voltage $V_\Sigma$ of the AFC circuit is the sum of the voltage stored in capacitor 144 and the discriminator voltage $V_d$. Consequently, any changes in the discriminator voltage are reflected in the AFC output voltage $V_\Sigma$. Since the output frequency of VCO 124 is proportional to the input voltage (currently $V_\Sigma$), any changes in the output voltage $V_\Sigma$ of the AFC circuit will cause a corresponding change in the VCO frequency. Consequently, the output frequency of frequency synthesizer 122 is frequency locked to the received control channel signal.

Since $V_\Sigma$ is equal to $V_e$ when switch 142 is closed, it is theoretically possible to eliminate switch 138 and directly connect the output of AFC circuit 114 (signal $V_\Sigma$) to the input of VCO 124. Placing the AFC circuit in the feedback path between the output of loop filter 132 and the input of VCO 124, however, will alter the dynamic characteristics of the frequency synthesizer to some degree. If switch 138 is eliminated, switching between the phase lock and frequency lock modes is controlled by switch 142. When switch 142 is closed, the phase lock mode is selected. Conversely, the frequency lock mode is selected when switch 142 is open.

Relative signal strength indicator 110 produces an output signal having a voltage proportional to the strength of the received signal. If the output voltage of RSSI 110 exceeds $V_{ref}$, the output of comparator 112 goes high. Conversely, if the output of RSSI 110 is below $V_{ref}$, the output of comparator 112 goes low. Consequently, the output of comparator 112 is high if, and only if the strength of the received signal exceeds a predetermined threshold level, as set by $V_{ref}$. In the event that the quality of the received control signal drops below this predetermined threshold level, the signal at the output of comparator 112 changes state, and controller 140 responds by reactivating the phase lock circuits and changing switch 138 back to the first position. In a similar manner, controller 140 reactivates the phase lock circuits and returns switch 132 to the first position prior to switching radio 102 to a non-control channel.

DETAILED SCHEMATIC OF AFC CIRCUIT

Figure 2:
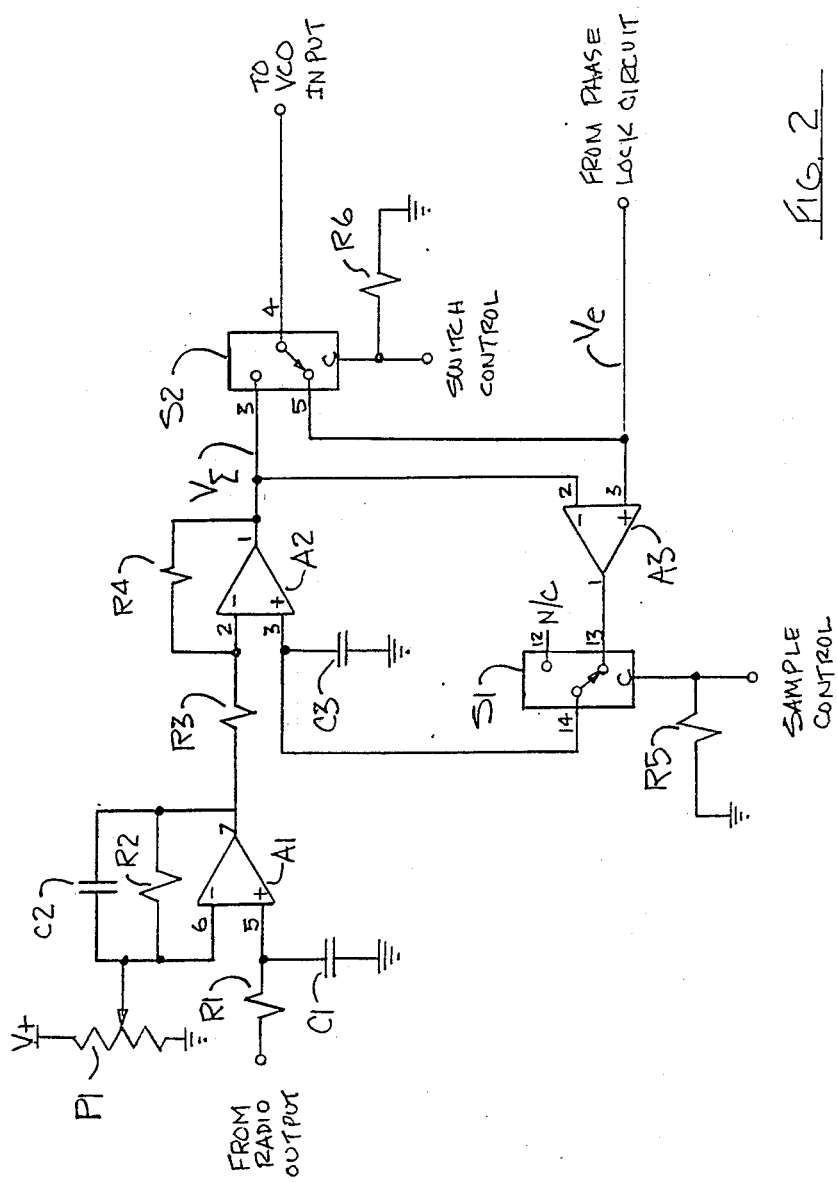
FIG. 2 is a schematic diagram of an exemplary embodiment of the AFC circuit of the present invention.

FIG. 2 is a schematic diagram of an exemplary embodiment of AFC circuit 114. Also included in FIG. 2 are exemplary embodiments of low pass filter 108 and switch 138. Referring to this figure, amplifiers A1, A2 and A3 are CMOS operational amplifiers, such as a Motorola MC14573 integrated circuit. Capacitor C1 is 47 micro-Farads, and capacitors C2 and C3 are 1 micro-Farad polypropylene capacitors. Potentiometer P1 is 50K Ohms. Resistors R1–R6 are 10K, 680K, 390K, 330K, 100K and 100K Ohms, respectively. Switches S1 and S2 are analog multiplexers, such as a Motorola MC14053 integrated circuit.

Amplifier A1, capacitors C1 and C2, potentiometer P1 and resistors R1 and R2 form a two pole, DC coupled, low pass filter. This filter is an exemplary embodiment of filter 108 of FIG. 1. Amplifier A2, and resistors R3 and R4 form an exemplary embodiment of summing circuit 120 of FIG. 1. For this summing circuit, the voltage at the non-inverting input of amplifier A2 is added to the inverse of the voltage at the output of amplifier A1. Switch S1 and capacitor C3 form an exemplary embodiment of sample and hold circuit 118 of FIG. 1. When switch S1 is closed (i.e., positioned as illustrated in FIG. 1), the output of amplifier A3 is directly connected to the non-inverting input of amplifier A2. Stated another way, the sample and hold circuit continuosly samples the voltage at the output of amplifier A3 when switch S1 is closed. When switch S1 is opened, the output of amplifier A3 is disconnected from capacitor C3 and the voltage that was present at the output of amplifier A3 just prior to opening the switch will be stored across capacitor C3. Since the input impedance of amplifier A2 is extremely large, this voltage can be stored in capacitor C3 for a considerable period of time without decreasing significantly.

Amplifier A3 is an example of comparator 116 of FIG. 1, while switch S2 is an example of switch 138. When switch S2 is positioned in the illustrated position, the phase lock circuits of a frequency synthesizer are connected to a VCO input, which is also part of the synthesizer (the frequency synthesizer and VCO are not illustrated in FIG. 2).

I claim as my invention:

1. A battery saver circuit, comprising in combination:
   a controlled oscillator having a control input and producing an output signal;
   selectable frequency lock means for frequency locking said output signal to a control signal;
   selectable phase lock means for phase locking said output signal to a reference signal;
   control means, switchably coupled to the control input of said controlled oscillator, for selecting one of said frequency lock and phase lock means:
   said frequency lock means comprising:
   a comparator circuit, a first input of said comparator circuit being coupled to said phase lock means;
   a sample and hold circuit, the input of said sample and hold circuit being coupled to the output of said comparator circuit; and
   a summing circuit, a first input of said summing circuit being coupled to the output of said sample and hold circuit, a second input of said summing circuit being coupled to said control signal, and the output of said summing circuit being coupled to a second input of said comparator circuit.

2. The battery saver circuit of claim 1, wherein said control means includes: a switch having first and second positions, an output of said phase lock means being coupled to an input of said frequency synthesizer when said switch is in said first position, and said output of said summing circuit being coupled to said input of said frequency synthesizer when said switch is in said second position.

3. The battery saver circuit of claim 1, wherein said control means includes: a switch having first and second positions, an output of said phase lock means being coupled to an input of said frequency synthesizer when said switch is in said first position, and an output of said frequency lock means being coupled to said input of said frequency synthesizer when said switch is in said second position.

4. A battery saver circuit for use in a communications system including a plurality of channels, one of said channels being a control channel, said control channel having a control channel signal, said battery saver circuit comprising in combination:
   a frequency synthesizer including a controlled oscillator having a control input and selectable phase lock means for phase locking said controlled oscillator to a reference signal;
   selectable automatic frequency control (AFC) means for frequency locking said controlled oscillator to said control channel signal;
   receiving means, coupled to said AFC means, for receiving signals on selected ones of said channels; and
   control means, switchably coupled to the control input of said controlled oscillator, for selecting said AFC means when said receiving means is receiving said control channel signal, and for disabling a portion of said phase lock means when said AFC means is selected, whereby the power consumption of said frequency synthesizer is reduced:
   said frequency lock means comprising:
   comparator means, a first input of said comparator means being coupled to said phase lock means:

sample and hold means, the input of said sample and hold means being coupled to the output of said comparator means:

summing means, a first input of said summing circuit means coupled to the output of said sample and hold means, a second input of said summing means being coupled to said control signal, and the output of said summing means being coupled to a second input of said comparator means.

5. The battery saver circuit of claim 4, wherein:

said receiving means further includes signal quality means for measuring the quality of said control channel signal; and said control means includes means for selecting said phase lock means when said receiving means is receiving said control channel signal and the quality of said control channel signal is below a predetermined threshold.

6. The battery saver circuit of claim 5, wherein said control means includes: a switch having first and second positions, an output of said phase lock means being coupled to an input of said controlled oscillator when said switch is in said first position, and an output of said AFC means being coupled to said input of said controlled oscillator when said switch is in said second position.

7. The battery saver circuit of claim 6, wherein said control means includes: a switch having first and second positions, an output of said phase lock means being coupled to an input of said controlled oscillator when said switch is in said first position, and said output of said summing circuit being coupled to said input of said controlled oscillator when said switch is in said second position.

8. The battery saver circuit of claim 4, wherein said control means includes: a switch having first and second positions, an output of said phase lock means being coupled to an input of said controlled oscillator when said switch is in said first position, and an output of said AFC means being coupled to said input of said controlled oscillator when said switch is in said second position.

9. A battery saver circuit for a frequency synthesizer having controlled oscillator means having a control input; high and low power operating modes, comprising:

frequency lock means for frequency locking a synthesizer output signal to a control signal;

phase lock means for phase locking the synthesizer output signal to a reference signal; and selecting means connected to the control input of said controlled oscillator means for selecting the frequency lock means when the frequency synthesizer is operating in the low power operating mode, and for selecting the phase lock means, when the frequency synthesizer is operating in the high power operating mode;

said frequency lock means comprising:

comparator means, a first input of said comparator means being coupled to said phase lock means:

sample and hold means, the input of said sample and hold means being coupled to the output of said comparator means:

summing means, a first input of said summing means being coupled to the output of said sample and hold means, a second input of said summing means being coupled to said control signal, and the output of said summing means being coupled to a second input of said comparator means.

* * * * *